United States Patent
Iwamoto et al.

(10) Patent No.: US 10,853,907 B2
(45) Date of Patent: *Dec. 1, 2020

(54) FAST GPU CONTEXT SWITCH

(71) Applicant: Apple Inc., Cupertino, CA (US)

(72) Inventors: Tatsuya Iwamoto, Foster City, CA (US); Kutty Banerjee, San Jose, CA (US); Rohan Sanjeev Patil, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,742

(22) Filed: Jul. 15, 2019

(65) Prior Publication Data

US 2019/0340723 A1 Nov. 7, 2019

Related U.S. Application Data

(63) Continuation of application No. 15/680,885, filed on Aug. 18, 2017, now Pat. No. 10,373,287.

(51) Int. Cl.
*G06T 1/20* (2006.01)
*G06F 9/48* (2006.01)

(52) U.S. Cl.
CPC ............... *G06T 1/20* (2013.01); *G06F 9/485* (2013.01); *G06F 9/4881* (2013.01)

(58) Field of Classification Search
CPC .......... G06T 1/20; G06F 9/485; G06F 9/4881
USPC ....................................................... 345/505
See application file for complete search history.

(56) References Cited

U.S. PATENT DOCUMENTS

| 8,310,492 | B2 | 11/2012 | McCrary |
| 8,842,122 | B2 | 9/2014 | Nordlund |
| 9,256,465 | B2 | 2/2016 | Hartog |
| 9,396,032 | B2 | 7/2016 | Nalluri |
| 2006/0294522 | A1* | 12/2006 | Havens ................. G06F 9/4887 718/103 |
| 2007/0174650 | A1* | 7/2007 | Won ....................... G06F 1/206 713/600 |
| 2014/0022266 | A1 | 1/2014 | Metz |
| 2015/0277981 | A1* | 10/2015 | Nalluri .................. G06F 9/5038 718/103 |
| 2016/0225348 | A1* | 8/2016 | Maiya ................... G06T 15/005 |

* cited by examiner

*Primary Examiner* — Ke Xiao
*Assistant Examiner* — Kim Thanh T Tran
(74) *Attorney, Agent, or Firm* — Blank Rome LLP

(57) ABSTRACT

Systems, methods, and computer readable media to improve task switching operations in a graphics processing unit (GPU) are described. As disclosed herein, the clock rate (and voltages) of a GPU's operating environment may be altered so that a low priority task may be rapidly run to a task switch boundary (or completion) so that a higher priority task may begin execution. In some embodiments, only the GPU's operating clock (and voltage) is increased during the task switch operation. In other embodiments, the clock rate (voltages) of supporting components may also be increased. For example, the operating clock for the GPU's supporting memory, memory controller or memory fabric may also be increased. Once the lower priority task has been swapped out, one or more of the clocks (and voltages) increased during the switch operation could be subsequently decreased, though not necessarily to their pre-switch rates.

22 Claims, 7 Drawing Sheets

FAST GPU CONTEXT SWITCH

BACKGROUND

This disclosure relates generally to computer systems operations. More particularly, but not by way of limitation, this disclosure relates to a technique for increasing the speed of a graphics processing unit's (GPU's) context switch operation. The parallel nature of GPUs can allow data parallel computations to be carried out at rates that are orders of magnitude greater than those offered by a traditional central processing unit (CPU). However, while CPUs may be interrupted to handle higher priority tasks quickly (i.e., with low latency), no such mechanism currently exists for GPUs. That is, GPUs typically execute one task at a time and do not switch between tasks. To switch a GPU from one (lower priority) task to another (higher priority) task, the GPU must be permitted to complete its current computation or to "flush" its pipeline. One of ordinary skill in the art will understand that the "task granularity" may be tied to a system's GPU architecture. In general, immediate-mode GPU architectures typically provide a finer level of granularity than do tiled mode GPU architectures. The required time to effect a GPU task switch can be significant especially in mobile devices with limited computational power (e.g., portable music devices, mobile telephones, electronic watches, digital cameras). For example, GPU task switch times on these types of devices may range between microseconds to milliseconds.

SUMMARY

The following summary is included in order to provide a basic understanding of some aspects and features of the claimed subject matter. This summary is not an extensive overview and as such it is not intended to particularly identify key or critical elements of the claimed subject matter or to delineate the scope of the claimed subject matter. The sole purpose of this summary is to present some concepts of the claimed subject matter in a simplified form as a prelude to the more detailed description that is presented below.

In one embodiment the disclosed concepts provide a method to switch from a lower priority task executing on a graphics processing unit (GPU) to a higher priority task. The method includes executing, on the GPU, a first task at a first GPU clock rate, the first task having a first priority (e.g., a "lower" priority); detecting, during execution of the first task at the first GPU clock rate, a second task scheduled for execution on the GPU, the second task having a second priority that is higher than the first priority; increasing, in response to detecting the second task, the first GPU clock rate to a second GPU clock rate; executing, on the GPU, the first task at the second GPU clock rate until a task switch boundary of the first task is reached; halting execution of the first task in response to reaching the first task's task switch boundary and, after halting execution of the first task, executing the second task on the GPU.

In one or more embodiments, the second GPU clock rate is the GPU's maximum operating clock rate while in other embodiments it is not (e.g., the second GPU clock rate could be a function of the second priority). In still other embodiments, increasing the GPU clock rate may be combined with increasing the GPU's operating voltage. In some embodiments, the first task's task switch boundary is reached before the first task completes processing. In still other embodiments, increasing the GPU's operating frequency to the second GPU clock rate may be combined with increasing the operating frequency of a GPU support element (e.g., a memory, memory controller or communication fabric coupled to the GPU). In yet other embodiments, executing the second task comprises executing the second task at the second GPU clock rate. In other embodiments, executing the second task comprises executing the second task at a third GPU clock rate, where the third GPU clock rate is higher than the first GPU clock rate and lower than the second GPU clock rate. In one or more other embodiments, the various methods described herein may be embodied in computer executable program code and stored in a non-transitory storage device. In yet another embodiment, the method may be implemented in an electronic device having one or more GPUs.

DETAILED DESCRIPTION

Figure 1:
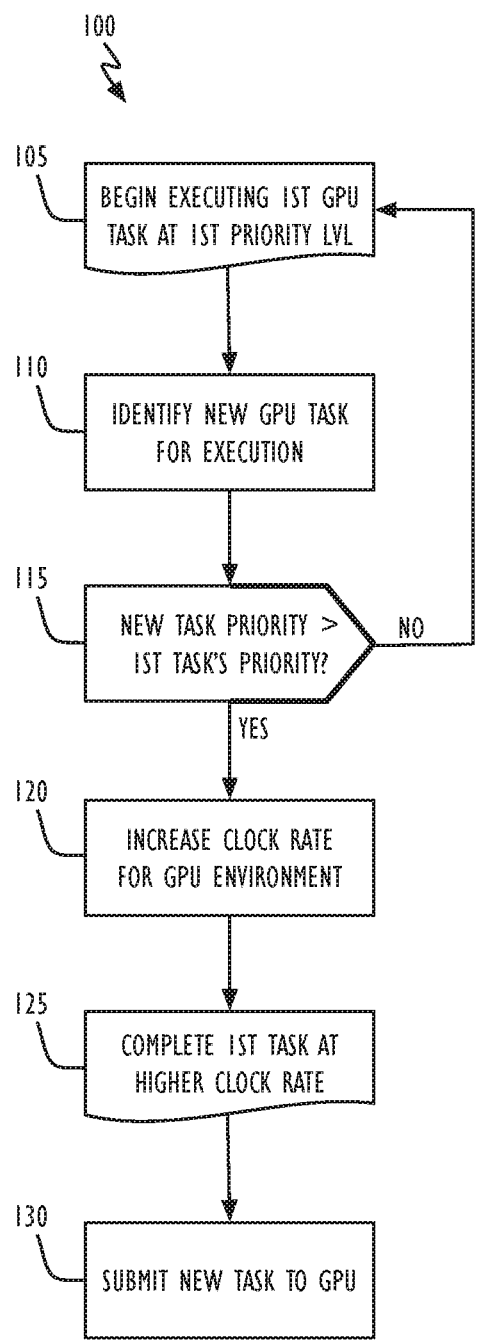
FIG. 1 shows, in flowchart form, a graphics processing unit (GPU) task switch operation in accordance with one or more embodiments.

This disclosure pertains to systems, methods, and computer readable media to improve the operation of a computer system that uses graphics processing units (GPUs). In general, techniques are disclosed for an improved GPU task switching operation. More particularly, techniques disclosed herein alter the clock rate of a GPU's operating environment so that a low priority task may be rapidly run to a task switch boundary (or completion) so that a higher priority task may begin execution. In some embodiments, once the higher priority GPU task has been detected the GPU's operating clock (and voltage) may be increased to permit the executing lower GPU priority task to more rapidly execute to a task switch point (or completion). In other embodiments, the clock rate (and voltage) of supporting components may also be increased. For example, the operating clock for the GPU's supporting memory and/or memory controller and/or communication fabric may also be increased during the task switch operation. Once the lower priority task has been run to a task switch boundary, the GPU operating clock may be further adjusted to conform to the higher priority task. That is, one or more of the clocks that were increased during the task switch operation could be subsequently decreased, though not necessarily to their pre-switch rates.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. While the boxes in any particular flowchart may be presented in a particular order, it should be understood that the particular sequence of any given flowchart is used only to exemplify one embodiment. In other embodiments, any of the various elements depicted in the flowchart may be deleted, or the illustrated sequence of operations may be performed in a different order or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

Embodiments of a GPU switch operation as set forth herein can assist with improving the functionality of computing devices or systems that utilize GPUs. Computer functionality can be improved by enabling such computing devices or systems to efficiently switch lower priority GPU tasks with higher priority GPU tasks. Use of the disclosed techniques can result in a more responsive system and reduce wasted computational resources (e.g., memory, processing power and computational time). For example, a device or system operating in accordance with this disclosure may respond more rapidly to user input events requiring the GPU.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics processing systems having the benefit of this disclosure.

Referring to FIG. 1, GPU task switch operation 100 in accordance with one or more embodiments begins while a first task is being executed by a GPU (block 105). During execution of this first task, the GPU may detect or identify a new task that it should also execute (block 110). If the new task has a higher assigned priority than the currently executing or "first" task (the "YES" prong of block 115), the clock rate of the GPU's environment may be increased (block 120) so that the first task may be completed or executed to a task switch point or boundary more quickly than if it had been allowed to continue executing as in block 105 (block 125), where after the new task may be submitted to the GPU for execution (block 130). If the new task does not have a higher assigned priority than the currently executing task (the "NO" prong of block 115), execution of the first task continues. As used herein, a "task switch point" or "task switch boundary" is simply a point in an executing code sequence at which the GPU may be stopped without the losing state and computational data associated with the code sequence.

As used herein, the term "priority" is used to connote the general concept of a status or condition in which something merits attention by virtue of an assigned importance level. The phrase "task priority" is used to connote a GPU work unit's (referred to herein as a task) assigned level of importance. In general, a "task" refers to a granularity of work that a central processing unit (CPU) can submit to a GPU. Threads, in contrast, are typically thought of as an execution context; for a GPU this refers to a vertex, pixel, etc. At the level of GPU work units, it is generally the operating system (OS) that assigns a GPU task's priority. In some operating systems a task's priority level may be fixed once assigned. In other operating systems a task's priority level may be allowed to fluctuate during its lifetime (up, down, or up and down). In still other operating systems a task's priority may come from a source other than the OS (e.g., a user-level application or via hardware arbitration). GPU task switching operations as described herein are applicable regardless of what entity or process assigns a GPU task's priority.

The phrase "GPU environment" is meant to capture both the GPU itself (e.g., the chip or die containing the GPU registers, arithmetic units, control circuitry and on-chip memory) as well as the computational infrastructure supporting GPU operations. Examples of these latter elements include, but are not limited to, any off-GPU memory accessed or used by the GPU and any communications network or system through which GPU output passes (including intermediary results). By way of example, consider FIG. 2 which shows partial computer system 200 that includes CPU module 205 having one or more CPUs or cores, GPU module 210 having one or more GPUs or cores, memory controller 215, system memory 220 and communication network 225 to facilitate data and computer program instruction transfer between the different units. Also shown are one or more clock signals 230 and one or more voltage signals 235. Clock signals 230 may be used to drive the various components (e.g., GPU 210 and communication network 225), and each component may use one or more clock signals (each of which may be different), some of which may be common or the same between the different components. Similarly, voltage signals 235 may be used to power the various components (e.g., memory controller 215 and system memory 220), and each component may use one or more voltage signals (each of which may be different), some of which may be common between the different components. System memory 220 may be used by both user-level applications 240 and OS routines 245 during run-time operations. Also shown in FIG. 2, GPU 210 may include computational hardware or circuitry 250 (e.g., shaders), memory 255, controller unit 260 and firmware 265. In the illustrated embodiment, controller 260 may perform GPU task switch operation 100 by executing instructions stored in firmware 265. In an alternative implementation, controller 260 could be a specialized hardware controller.

Figure 3:
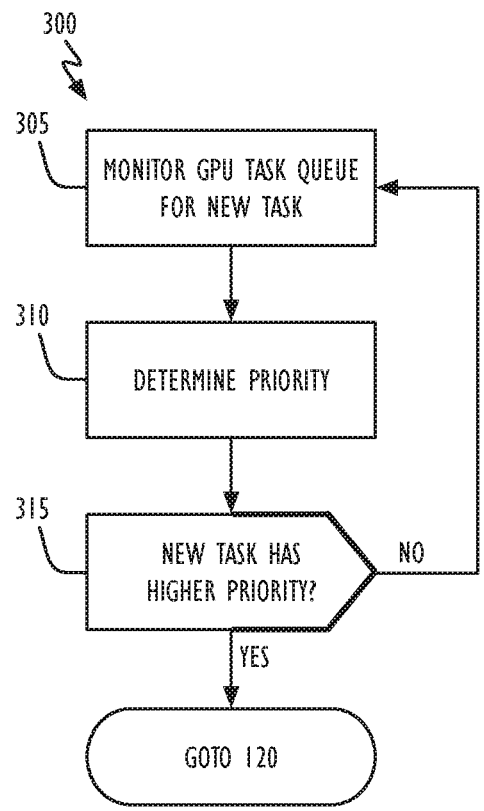
FIG. 3 shows, in flowchart form, GPU controller actions in accordance with one or more embodiments.

Referring to FIG. 3, controller 260—executing instructions from firmware 265—may perform GPU task monitor operation 300 as shown (e.g., acts in accordance with blocks 110 and 115). To begin, controller 260 monitors the GPU's task queue (e.g., retained in on-GPU memory 255) to determine when a new task has been delivered to GPU 210 (block 305). Controller 260 may then determine the task's priority (block 310) by, for example, interrogating metadata associated with the new task which may also be stored in on-GPU memory 255. If the new task has a higher priority than the currently executing task (the "YES" prong of block 315), GPU task switch operation 100 continues to block 120. If the new task does not have a higher priority than the executing task (the "NO" prong of block 315), GPU controller operation 300 returns to monitoring the GPU's task queue (block 305).

A task priority scheme in accordance with one or more embodiments is shown in Table 1. Illustrative actions associated with user-interface actions (high priority) can include tasks associated with real-time actions and any task that renders a visible element to a display screen (e.g., compositor actions). Illustrative actions associated with media systems (high-normal priority) can include media encoding and decoding tasks and video capture actions. Illustrative actions associated with applications (normal priority) can include games and other actions taken by user-level applications. Illustrative actions associated with daemons (background or low priority) can include actions not associated with user interaction such as data mining.

TABLE 1

Example Priority Scheme

| Priority | Example Actions |
| --- | --- |
| High | User-Interface Actions |
| High-Normal | Media Systems' Actions |
| Normal | User Applications |
| Background/Low | Daemons etc. |

It should be understood that the priority scheme outlined in Table 1 is merely illustrative. GPU task switch operation 100 in accordance with this disclosure may be implemented in any system in which GPU tasks may be assigned more than one priority. This includes schemes that utilize priority bands, where a task's priority within a band may be dynamically changed, but a task may not transition from one band to another.

Figure 2:
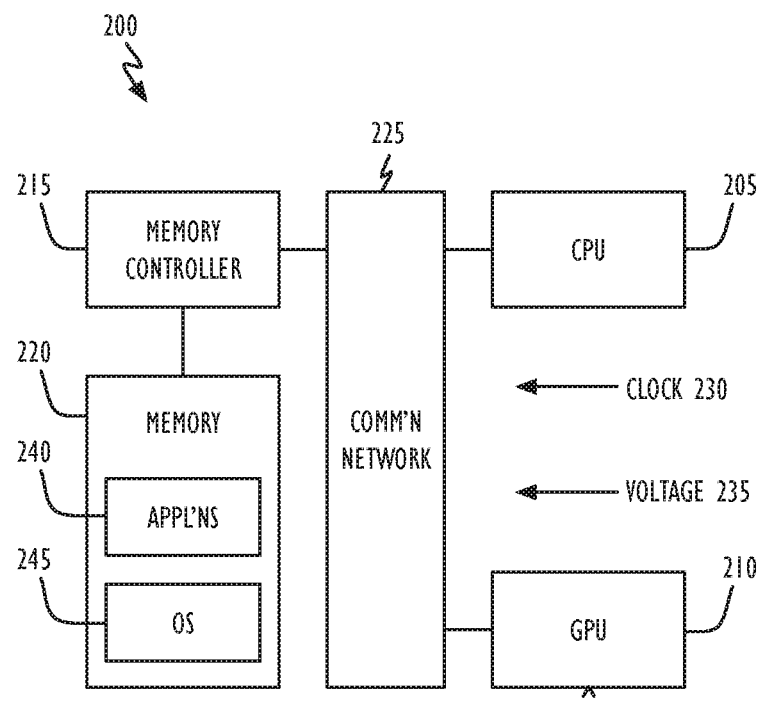
FIG. 2 shows, in block diagram form, a partial computer system in accordance with one or more embodiments.
Figure 2:
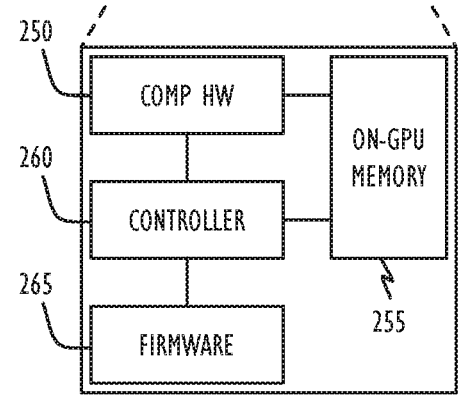
Figure 4:
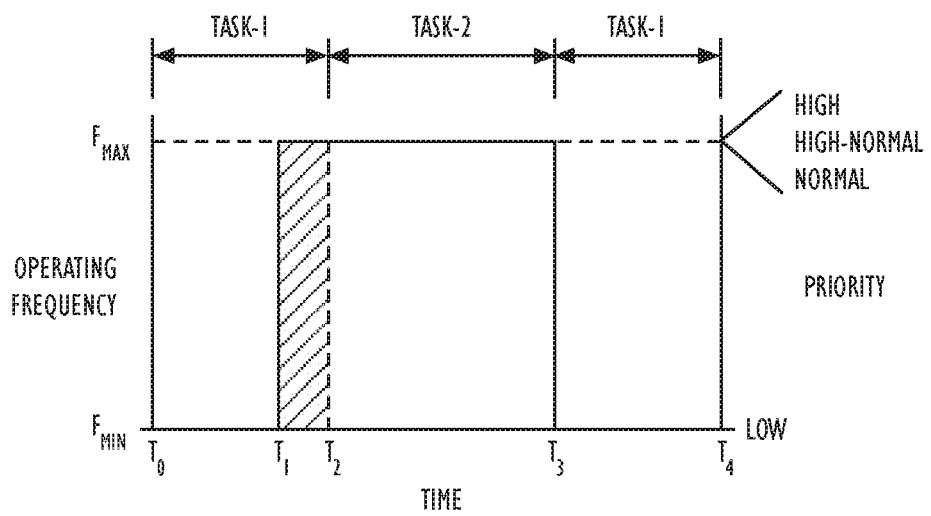
FIG. 4 illustrates the processing time required to execute a low priority and a high priority task in accordance with one or more embodiments.

Referring to FIG. 4, in one embodiment a system in accordance with FIG. 2 has only two operating frequencies $F_{min}$ and $F_{max}$ (each with one or more corresponding operating voltages): low or background priority GPU tasks operate at $F_{min}$ while high, high-normal and normal priority GPU tasks operate at $F_{max}$ (see Table 1). It should be recognized that the speed at which a digital circuit can switch states is proportional to the circuit's voltage differential. As such, reducing a circuit's voltage differential means the circuit's maximum operating frequency is reduced. If the circuit is a GPU (e.g., GPU 210), this means fewer instructions can be performed per unit time. If the circuit is a memory (e.g., system memory 220 or GPU memory 255), this means fewer memory access operations can be performed per unit time. And if the circuit is a communication network or fabric (e.g., communication network 225), this means fewer data transfers over or across the network can be made per unit time. In the example shown, a low priority GPU task (task-1) is operating when, at $T_1$ a higher priority GPU task (task-2) is detected. At that time, the GPU's operating frequency is increased to $F_{max}$ so that task-1 quickly moves to a task switch boundary, which is illustrated as occurring at time $T_2$. At time $T_2$, non-background priority task-2 is issued to the GPU where after it executes at frequency $F_{max}$ until time $T_3$ when it completes. At time $T_3$ low priority task-1 may be re-issued to the GPU where it continues execution at frequency $F_{min}$ until it completes at time $T_4$. From FIG. 4:

$$T_{TASK-1}=(T_1-T_0)+\alpha(T_2-T_1)+(T_4-T_3), \text{ and}$$

$$T_{TASK-2}=(T_3-T_2).$$

Here, $T_{TASK-1}$ represents the time interval needed to complete low GPU priority task-1 at its target operating frequency $F_{min}$, $T_{TASK-2}$ represents the time interval needed to complete non-low GPU priority task-2, and α represents a multiplier greater than 1 and may be a function of the two operating frequencies (e.g., the ratio of $F_{max}$ to $F_{min}$) and accounts for the time spent executing low GPU priority task-1 at $F_{max}$ (rather than its standard or prior art operating frequency $F_{min}$).

Figure 5:
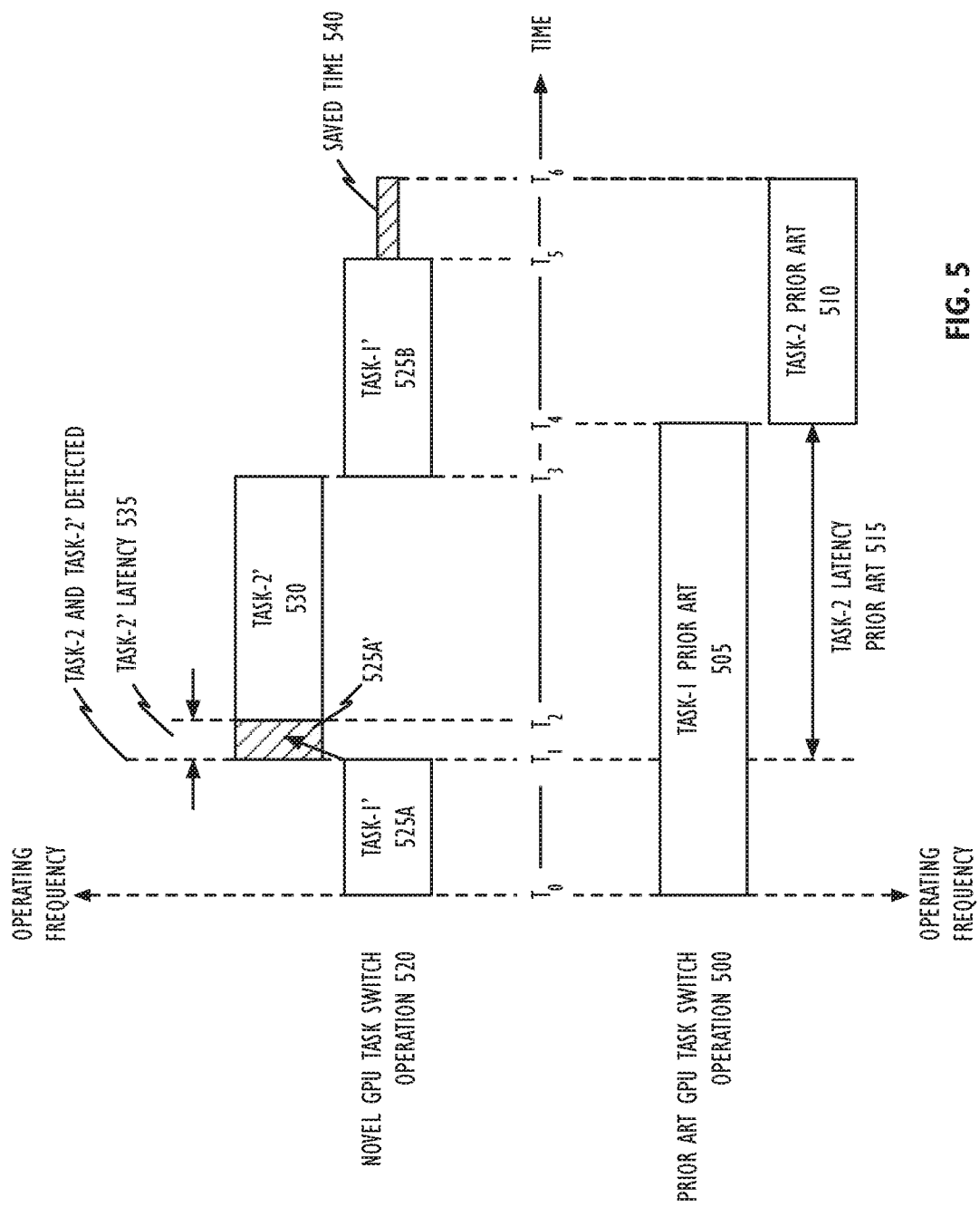
FIG. 5 compares the operating times of two GPU tasks in accordance with one embodiment and the prior art.

Referring to FIG. 5, the run-time of two tasks in accordance with one or more embodiments and one prior art implementation are compared. In prior art approach 500, task-1 505 begins at time $T_0$ and, while higher GPU priority task-2 510 is identified at time $T_1$, task-1 must execute at its given rate ($F_{min}$) until complete, where after task-2 510 may execute until its completion at time $T_6$. Accordingly, task-2 latency in accordance with this prior art implementation is illustrated by time interval 515. In contrast, GPU switch operation in accordance with this disclosure 520 has task-1' 525 (having first portions 525A and 525A' and second portion 525B) beginning at time $T_0$ and higher GPU priority task-2' 530 identified at time $T_1$. In contrast to prior art operation 500 however, task-1' 525A is executed at a higher frequency from the time task-2' 530 is detected ($T_1$) until time $T_2$ where task-1' 525A reaches a task switch boundary (represented by Task-1' portion 525A'). At time $T_2$ task-2' 530 begins execution at its corresponding higher clock frequency until time $T_3$ where it completes. Lower GPU priority task-1' 525B may then be executed at its corresponding lower clock frequency until it completes at time $T_5$. As shown, latency 535 of task-2' is far less than latency 515 of prior art task-2. In addition, it can also turn out that the overall time to complete the two tasks may be shorter; see saved time period 540. (This example assumes task-1 505 and task-1' 525 are the same task and that task-2 510 and task-2' 530 are the same.)

Figure 6:
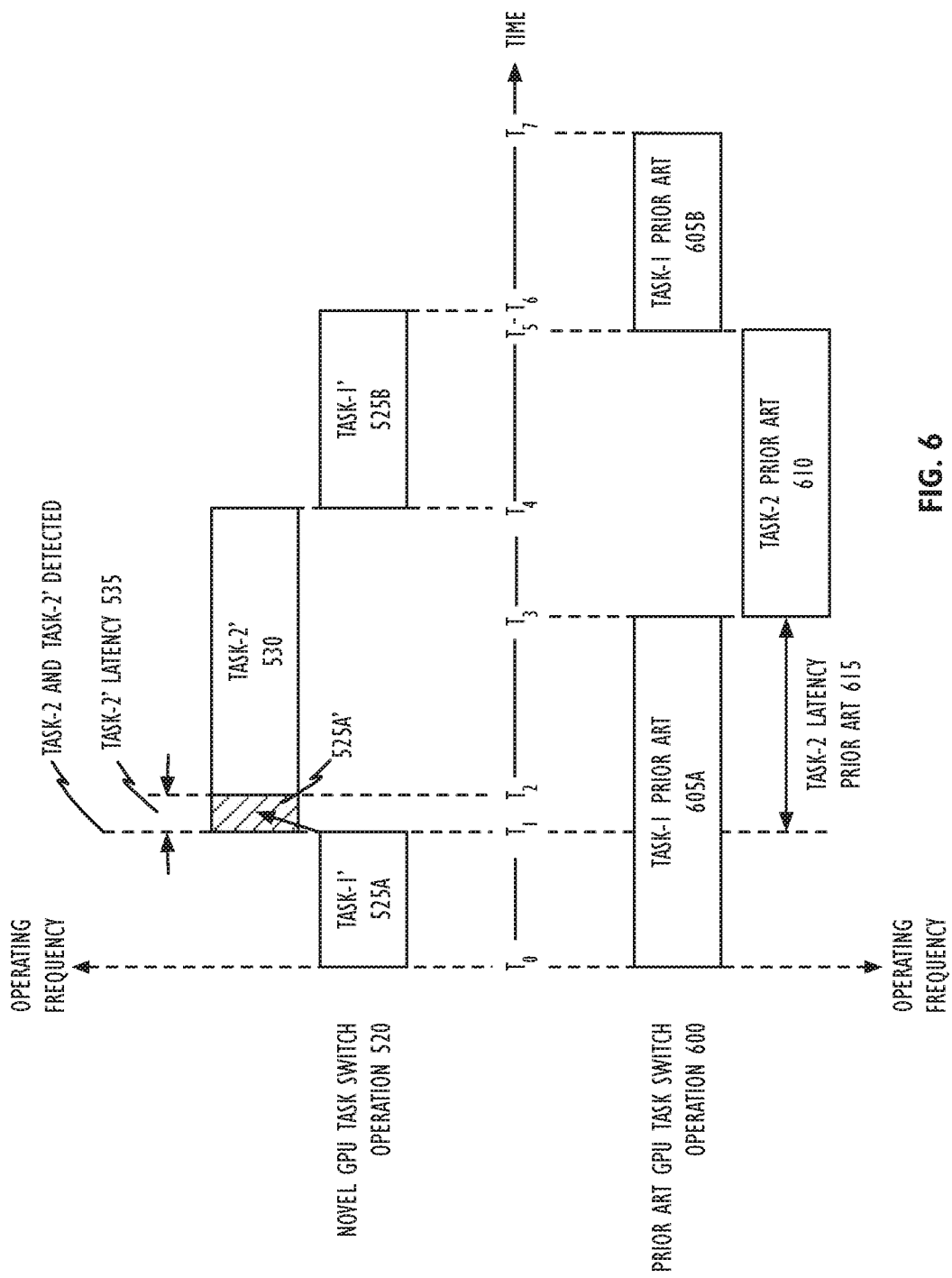
FIG. 6 compares the operating times of two GPU tasks in accordance with one embodiment and another prior art implementation.

Referring to FIG. 6, the run-time of two tasks in accordance with a different prior art implementation are compared. In prior art approach 600, task-1 (including first portion 605A and second portion 605B) begins at time $T_0$ and, while higher GPU priority task-2 610 is identified at time $T_1$, task-1 605A must execute at its given rate ($F_{min}$) until a task switch boundary is reached at time $T_3$, where after task-2 610 may execute until its completion at time $T_5$. After higher GPU priority task-2 610 has completed, task-1 portion 605B may execute until complete at time $T_7$. Accordingly, task-2 latency in accordance with this prior art implementation is illustrated by time interval 615. As discussed above, GPU switch operation in accordance with this disclosure 520 has task-1' 525 (including first portions 525A and 525A' and second portion 525B) beginning at time $T_0$ with higher GPU priority task-2' 530 identified at time $T_1$. In contrast to prior art operation 600, task-1' transitions from executing at a low priority execution frequency when higher GPU priority task-2' is detected at time $T_1$ (represented by task-1' portion 525A) until time $T_2$ where task-1' 525A reaches a task switch boundary (represented by task-1' portion 525A'). At time $T_2$ higher GPU priority task-2' 530 begins execution at its corresponding higher clock frequency until time $T_4$ where it completes. Lower GPU priority task-1' 525 (i.e. portion 525B), may then be executed at its corresponding lower clock frequency until it completes at time $T_6$ (completing portion 525B). A primary benefit of novel GPU task switch operation 520 is that higher priority task-2's latency is shorter than that of corresponding latency 615. (This example assumes the same relationships between task switch operation 600 and 500 as made with respect to FIG. 5.) In both FIGS. 5 and 6, it is significant that task latency time 535 provided in accordance with this disclosure is less than task latency times 515 or 615 in accordance with the prior art.

Figure 7:
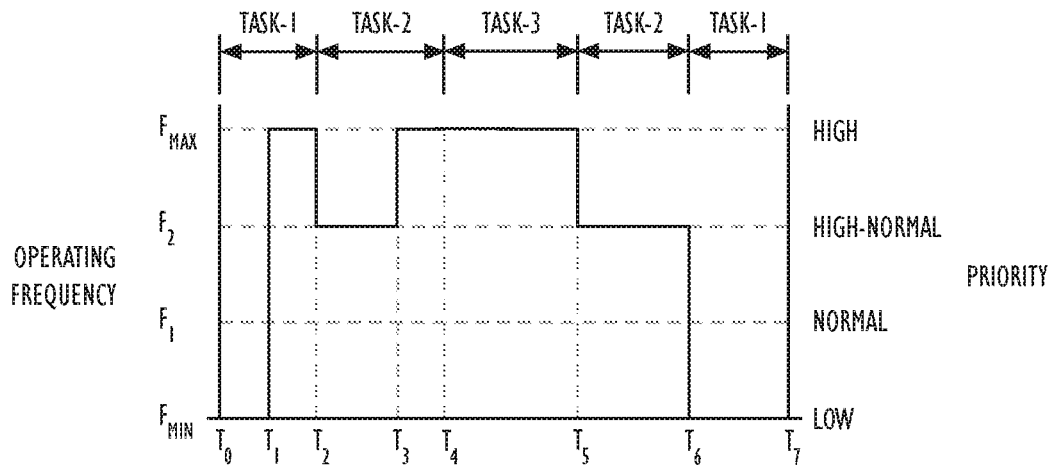
FIG. 7 shows a timing diagram for three GPU tasks in accordance with one or more embodiments.

It should be understood that more than two (2) priority levels may exist; two were shown in FIGS. 5 and 6 to simplify the presentation. If more than two priority levels are provided, there may be occasions that multiple preemptions occur. By way of example see FIG. 7. There, low GPU priory task-1 is executing when, at time $T_1$, a higher priority GPU task-2 is detected (e.g., having a high-normal GPU priority). In accordance with this disclosure task-1 may begin executing at the highest available frequency ($F_{max}$) until it completes or reaches a task switch boundary at time $T_2$, where after task-2 begins executing at its assigned frequency ($F_2$). At time $T_3$ a yet higher priority GPU task is detected causing task-2 to begin executing at the highest available frequency ($F_{max}$) until it completes or reaches a task switch boundary at time $T_4$. At time $T_4$ high GPU priority task-3 begins executing, completing at time $T_5$, where after high-normal GPU priority task-2 may resume execution at frequency $F_2$. At time $T_6$ task-2 completes permitting low priority GPU task-1 to resume. In this example, task-1 is preempted by task-2 which is itself preempted by task-3.

In FIGS. 4-7 each task was associated with a single frequency (e.g., $F_{min}$, $F_2$ or $F_{max}$). As noted above however, there could be multiple operating frequencies and voltages that get adjusted when a GPU's environment changed. For example, in one embodiment only the GPU's operating frequency and voltage may be increased (e.g., from $F_{min}$ to $F_{max}$). In another embodiment, the GPU's operating frequency (and voltage) may be increased to one value while the operating frequency of the system's external RAM may be increased to a second value. In still another embodiment, the GPU's operating frequency may be increased to one value, the operating frequency of the system's external RAM may be increased to a second value, and the operating frequency of the system's communication network or fabric may be increased to a third value. In yet other embodiments, the GPU's operating frequency does not need to be increased to the maximum operating frequency. Instead, for example, the GPU's operating frequency may be raised to a frequency ($F_{new}$) that is less than the maximum operation GPU frequency ($F_{max}$): that is, $F_{new} < F_{max}$.

Figure 8:
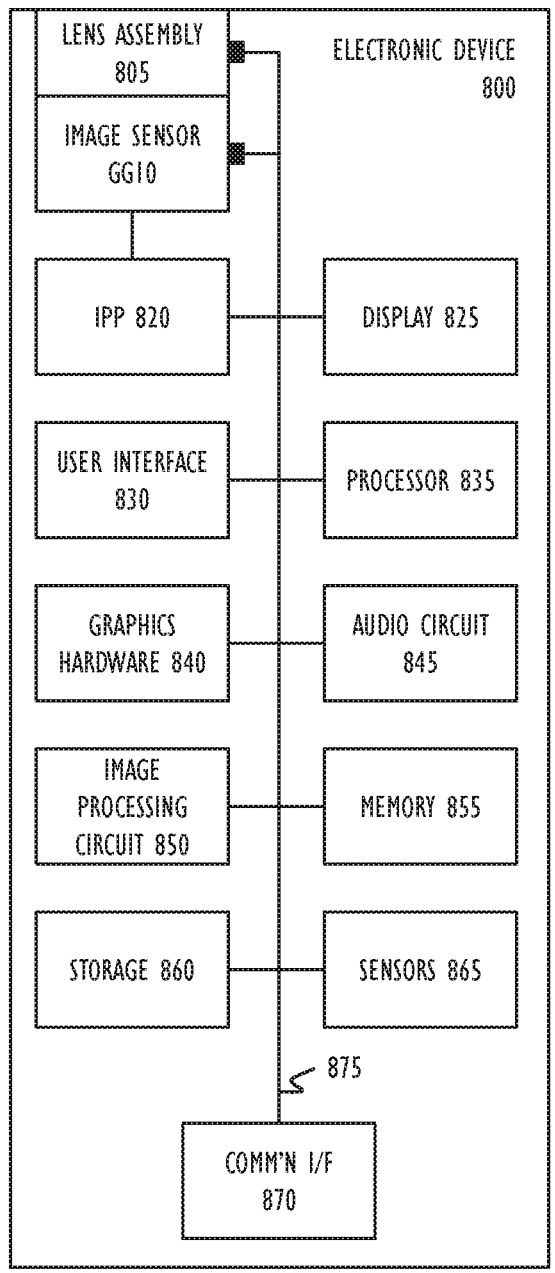
FIG. 8 shows, in block diagram form, an electronic device in accordance with one or more embodiments.

Referring to FIG. 8, a simplified functional block diagram of illustrative electronic device 800 capable of utilizing an improved GPU switch operation as described herein is shown according to one or more embodiments. Electronic device 800 could be, for example, a mobile telephone, personal media device, a notebook computer system, a tablet computer system, or a desktop computer system. As shown, electronic device 800 may include lens assembly 805 and image sensor 810 for capturing images of a scene. In addition, electronic device 800 may include image processing pipeline (IPP) 815, display element 820, user interface 825, processor(s) 830, graphics hardware 835, audio circuit 840, image processing circuit 845, memory 850, storage 855, sensors 860, communication interface 865, and communication network or fabric 870.

Lens assembly 805 may include a single lens or multiple lens, filters, and a physical housing unit (e.g., a barrel). One function of lens assembly 805 is to focus light from a scene onto image sensor 810. Image sensor 810 may, for example, be a CCD (charge-coupled device) or CMOS (complementary metal-oxide semiconductor) imager. There may be more than one lens assembly and more than one image sensor. There could also be multiple lens assemblies each focusing light onto a single image sensor (at the same or different times) or different portions of a single image sensor. IPP 815 may process image sensor output (e.g., RAW image data from sensor 810) to yield a high dynamic range image, image sequence or video sequence. More specifically, IPP 815 may perform a number of different tasks including, but not be limited to, black level removal, de-noising, lens shading correction, white balance adjustment, demosaic operations, and the application of local or global tone curves or maps. IPP 815 may comprise a custom designed integrated circuit, a programmable gate-array, CPU, a GPU, memory, or a combination of these elements (including more than one of any given element). Some functions provided by IPP 815 may be implemented at least in part via software (including firmware). Display element 820 may be used to display text and graphic output as well as receiving user input via user interface 825. For example, display element 820 may be a touch-sensitive display screen. User interface 825 can also take a variety of other forms such as a button, keypad, dial, a click wheel, and keyboard. Processor 830 may be a system-on-chip (SOC) such as those found in mobile devices and include one or more dedicated CPUs and one or more GPUs (e.g., of the type shown in FIG. 2). Processor 830 may be based on reduced instruction-set computer (RISC) or complex instruction-set computer (CISC) architectures or any other suitable architecture and each computing unit may include one or more processing cores. Graphics hardware 835 may be special purpose computational hardware for processing graphics and/or assisting processor 830 perform computational tasks. In one embodiment, graphics hardware 835 may include one or more programmable GPUs each with one or more cores (e.g., of the type illustrated in FIG. 2). Audio circuit 840 may include one or more microphones, one or more speakers and one or more audio codecs. Image processing circuit 845 may aid in the capture of still and video images from image sensor 810 and include at least one video codec. Image processing circuit 845 may work in concert with IPP 815, processor 830 and/or graphics hardware 835. Images, once captured, may be stored in memory 850 and/or storage 855. Memory 850 may include one or more different types of media used by IPP 815, processor 830, graphics hardware 835, audio circuit 840, and image processing circuitry 845 to perform device functions. For example, memory 850 may include memory cache, read-only memory (ROM), and/or random access memory (RAM). Storage 855 may store media (e.g., audio, image and video files), computer program instructions or software, preference information, device profile information, and any other suitable data. Storage 855 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Device sensors 860 may include, but need not be limited to, an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor sensor, an electrostatic sensor, a temperature sensor, a heat sensor, a thermometer, a light sensor, a differential light sensor, an opacity sensor, a scattering light sensor, a diffractional sensor, a refraction sensor, a reflection sensor, a polarization sensor, a phase sensor, a florescence sensor, a phosphorescence sensor, a pixel array, a micro pixel array, a rotation sensor, a velocity sensor, an inclinometer, a pyranometer and a momentum sensor. Communication interface 865 may be used to connect device 800 to one or more networks. Illustrative networks include, but are not limited to, a local network such as a universal serial bus (USB) network, an organization's local area network, and a wide area network such as the Internet. Communication interface 865 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). Communication network or fabric 870 may be comprised of one or more continuous (as shown) or discontinuous communication links and be formed as a bus network, a communication network, or a fabric comprised of one or more switching devices (e.g., a cross-bar switch).

As noted above, various disclosed embodiments include software (e.g., software or firmware executed my microcontroller 260 of GPU 210). As such, a description of common computing software architecture is provided as expressed in a layer diagram shown in FIG. 9. Like the hardware examples introduced above, the software architecture discussed here is not intended to be exclusive in any way, but rather to be illustrative. This is especially true for layer-type diagrams, which software developers tend to express in somewhat differing ways. Software architecture 900 rests upon base hardware layer 905 which may include, memory, CPUs, GPUs or other processing and/or computer hardware such as memory controllers. "Above" hardware layer 905 is the OS kernel layer 910 which represents kernel software that may perform memory management, device management, and system calls (often the purview of hardware drivers, such as a GPU driver). The notation employed here is generally intended to imply that software elements shown in one layer use resources from the layers below and provide services to layers above. In practice however, all components of a particular software element may not behave entirely in that manner. OS services layer 915 includes OS services 915A (software to provide core OS functions in a protected environment), OpenGL® 915B (an example of a well-known library and application-programming interface for graphics rendering including two-dimensional and three-dimensional graphics), Metal® 915C (another published graphics library and framework that supports fine-grained, low-level control of the organization, processing, and submission of graphics data and commands to a GPU, as well as the management of associated data and resources for those commands), software ray-tracer 915D (representing software for creating image information based on the process of tracing the path of light through pixels in the plane of an image), and software rasterizer 915E (representing software used to make graphics information such as pixels without specialized graphics hardware such as a GPU). (OPENGL is a registered trademark of the Silicon Graphics International Corporation. METAL is a registered trademark of Apple Inc.)

Application services layer 920 represents higher-level frameworks that are commonly directly accessed by application programs. In some embodiments application services layer 920 includes graphics-related frameworks and other services 920A that are high level in that they are agnostic to the underlying graphics libraries (such as those discussed with respect to layer 915). In such embodiments, these higher-level graphics frameworks are meant to provide developer access to graphics functionality in a more user/developer friendly way and allow developers to avoid working with shading and graphics primitives. By way of example, illustrative higher-level graphics frameworks may include SpriteKit 920B (a graphics rendering and animation infrastructure that may be used to animate textured images or "sprites"), SceneKit 920C (a 3D-rendering framework that supports the import, manipulation, and rendering of 3D assets at a higher level than frameworks having similar capabilities, such as OpenGL), Core Animation 920D (a graphics rendering and animation infrastructure that may be used to animate views and other visual elements of an application), and core graphics 920E (a 2D drawing engine—made available from Apple Inc.—that provides 2D rendering for applications). (SPRITEKIT, SCENEKIT and CORE ANIMATION are registered trademarks of Apple Inc.) Above application services layer 920 is application layer 925 which may include any type of application program. By way of example, photos application 925A (a photo management, editing, and sharing program), movie application 925B (for making, editing and sharing movie files), finance application 925C (a financial management application), and two generic user-level applications APP-A 925D and App-B 925E.

Figure 9:
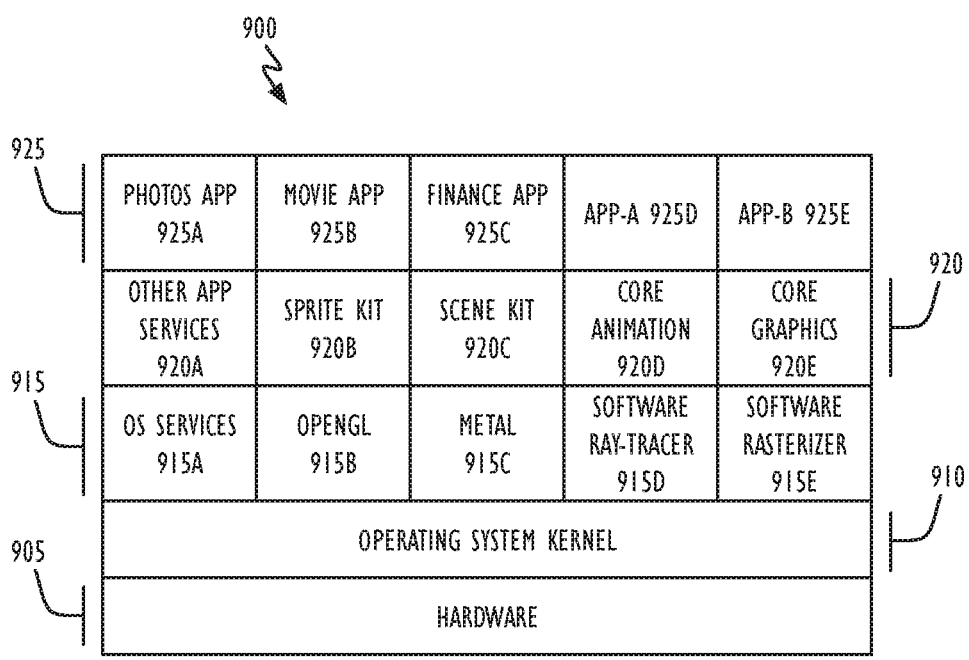
FIG. 9 shows an illustrative software architecture in accordance with one or more embodiments.

In evaluating software architecture 900 it may be useful to realize that different frameworks have higher- or lower-level application program interfaces, even if the frameworks are represented in the same layer. FIG. 9 serves to provide a general guideline and to introduce exemplary frameworks that may be useful to various disclosed embodiments. Importantly, FIG. 9 is not intended to limit the types of frameworks or libraries that may be used in any particular way or in any particular embodiment.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A graphics processing unit (GPU) method, comprising:
   executing, on the GPU, a first task in a GPU environment with a first voltage level, the first task having a first priority;
   detecting, during execution of the first task in the GPU environment, a second task scheduled for execution on the GPU, the second task having a second priority that is higher than the first priority;

increasing, in response to detecting the second task, the voltage level of the GPU environment from the first voltage level to a second voltage level;

executing, on the GPU, the first task in the GPU environment with the second voltage level until a task switch boundary of the first task is reached;

halting execution of the first task in response to reaching the task switch boundary; and executing, on the GPU, the second task after halting execution of the first task.

2. The GPU method of claim 1, wherein the GPU comprises a plurality of GPU cores, and wherein the GPU method further comprises using the second voltage level to increase an operating frequency of at least one of the plurality of GPU cores.

3. The GPU method of claim 2, wherein the GPU comprises shader hardware, and wherein the GPU method further comprises using the second voltage level to increase an operating frequency of the GPU.

4. The GPU method of claim 1, further comprising using the second voltage level to increase an operating frequency of a GPU core of the GPU to a maximum operating frequency.

5. The GPU method of claim 1, further comprising:
using the first voltage level to provide a first operating frequency for a GPU core of the GPU;
using the second voltage level to provide a second operating frequency of the GPU core, wherein the second operating frequency is greater than the first operating frequency and less than a maximum operating frequency.

6. The GPU method of claim 1, further comprising using the second voltage level to increase operating frequencies of a GPU core of the GPU, a random-access memory (RAM), and a communication network or fabric, wherein each of the operating frequencies are different.

7. The GPU method of claim 1, wherein the second task is associated with a user interface action.

8. The GPU method of claim 1, wherein the GPU environment includes a GPU core of the GPU, an off-GPU memory, and a communications network or fabric, and wherein the GPU method further comprises using the second voltage level to increase an operating frequency of at least one of the GPU core, the off-GPU memory, and the communications network or fabric.

9. A non-transitory program storage device, readable by a processor and comprising instructions stored thereon to cause one or more graphics processing units (GPUs) to:
execute a first task in a GPU environment using a first voltage level, the first task having a first priority;
detect, during execution of the first task in the GPU environment, a second task scheduled for execution in the GPU environment, the second task having a second priority that is higher than the first priority;
increase, in response to detection of the second task, the voltage level of the GPU environment from the first voltage level to a second voltage level;
execute the first task in the GPU environment using the second voltage level until a task switch boundary of the first task is reached;
halt execution of the first task in response to reaching the task switch boundary; and
execute the second task in the GPU environment after halting execution of the first task.

10. The non-transitory program storage device of claim 9, wherein the GPU comprises a plurality of GPU cores, and wherein the instructions further cause the second voltage level to be used to increase an operating frequency of at least one of the plurality of GPU cores.

11. The non-transitory program storage device of claim 9, wherein the GPU comprises shader hardware, and wherein the instructions further cause the second voltage level to be used to increase an operating frequency of the GPU.

12. The non-transitory program storage device of claim 9, wherein the instructions further cause the second voltage level to be used to increase an operating frequency of a GPU core to a maximum operating frequency.

13. The non-transitory program storage device of claim 9, wherein the instructions further cause:
the first voltage level to be used to provide a first operating frequency for a GPU core of the GPU;
the second voltage level to be used to provide a second operating frequency of the GPU core, wherein the second operating frequency is greater than the first operating frequency and less than a maximum operating frequency.

14. The non-transitory program storage device of claim 9, wherein the instructions further cause the second voltage level to be used to increase operating frequencies of a GPU core of the GPU, a random-access memory (RAM), and a communication network or fabric, wherein each of the operating frequencies are different.

15. The non-transitory program storage device of claim 9, wherein the GPU environment includes a GPU core of the GPU, an off-GPU memory, and a communications network or fabric, and wherein instructions further cause the second voltage level to be used to increase an operating frequency of at least one of the GPU core, the off-GPU memory, and the communications network or fabric.

16. An electronic device, comprising:
a graphics processing unit (GPU);
a memory communicatively coupled to the GPU;
a controller communicatively coupled to the GPU and the memory, the controller configured to execute instructions stored in the memory to—
execute a first task in a GPU environment using a first voltage level, the first task having a first priority;
detect, during execution of the first task in the GPU environment, a second task scheduled for execution in the GPU environment, the second task having a second priority that is higher than the first priority;
increase, in response to detection of the second task, the voltage level of the GPU environment from the first voltage level to a second voltage level;
execute the first task in the GPU environment using the second voltage level until a task switch boundary of the first task is reached;
halt execution of the first task in response to reaching the task switch boundary; and
execute the second task in the GPU environment after halting execution of the first task.

17. The electronic device of claim 16, wherein the GPU comprises a plurality of GPU cores, and wherein the instructions further cause the second voltage level to be used to increase an operating frequency of at least one of the plurality of GPU cores.

18. The electronic device of claim 16, wherein the GPU comprises shader hardware, and wherein the instructions further cause the second voltage level to be used to increase an operating frequency of the GPU.

19. The electronic device of claim 16, wherein the instructions further cause the second voltage level to be used to increase an operating frequency of a GPU core to a maximum operating frequency.

20. The electronic device of claim 16, wherein the instructions further cause:
the first voltage level to be used to provide a first operating frequency for a GPU core of the GPU;
the second voltage level to be used to provide a second operating frequency of the GPU core, wherein the second operating frequency is greater than the first operating frequency and less than a maximum operating frequency.

21. The electronic device of claim 16, wherein the instructions further cause the second voltage level to be used to increase operating frequencies of a GPU core of the GPU, a random-access memory (RAM), and a communication network or fabric, wherein each of the operating frequencies are different.

22. The electronic device of claim 16, wherein the GPU environment includes a GPU core of the GPU, an off-GPU memory, and a communications network or fabric, and wherein instructions further cause the second voltage level to be used to increase an operating frequency of at least one of the GPU core, the off-GPU memory, and the communications network or fabric.

\* \* \* \* \*